Patented Sept. 12, 1922.

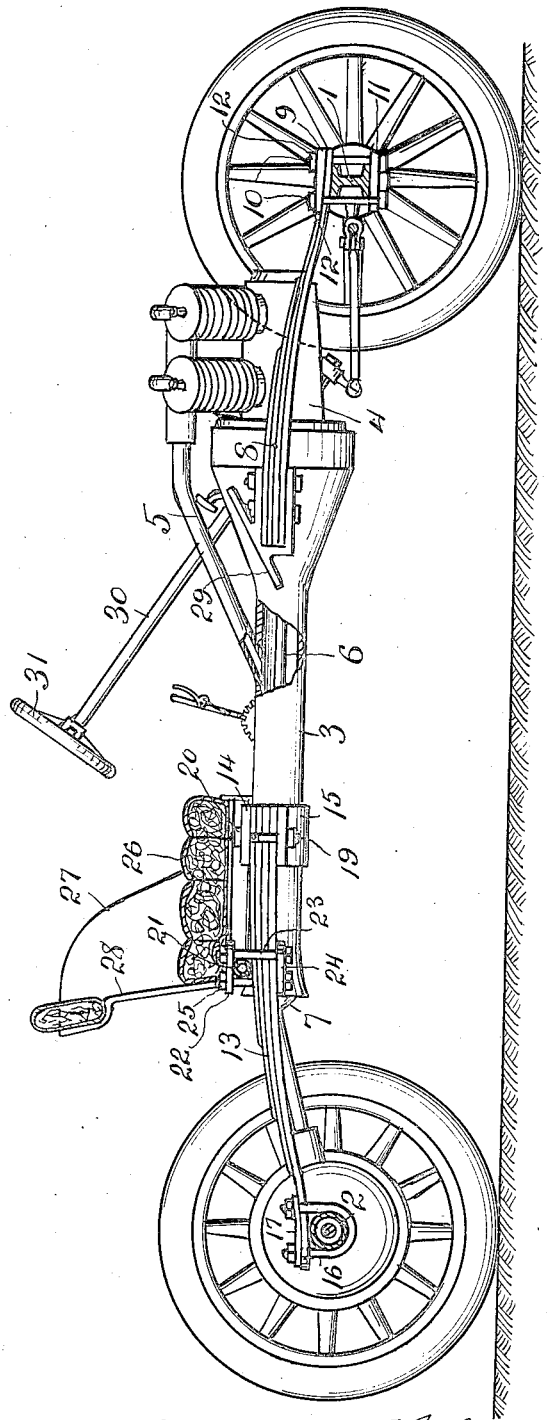

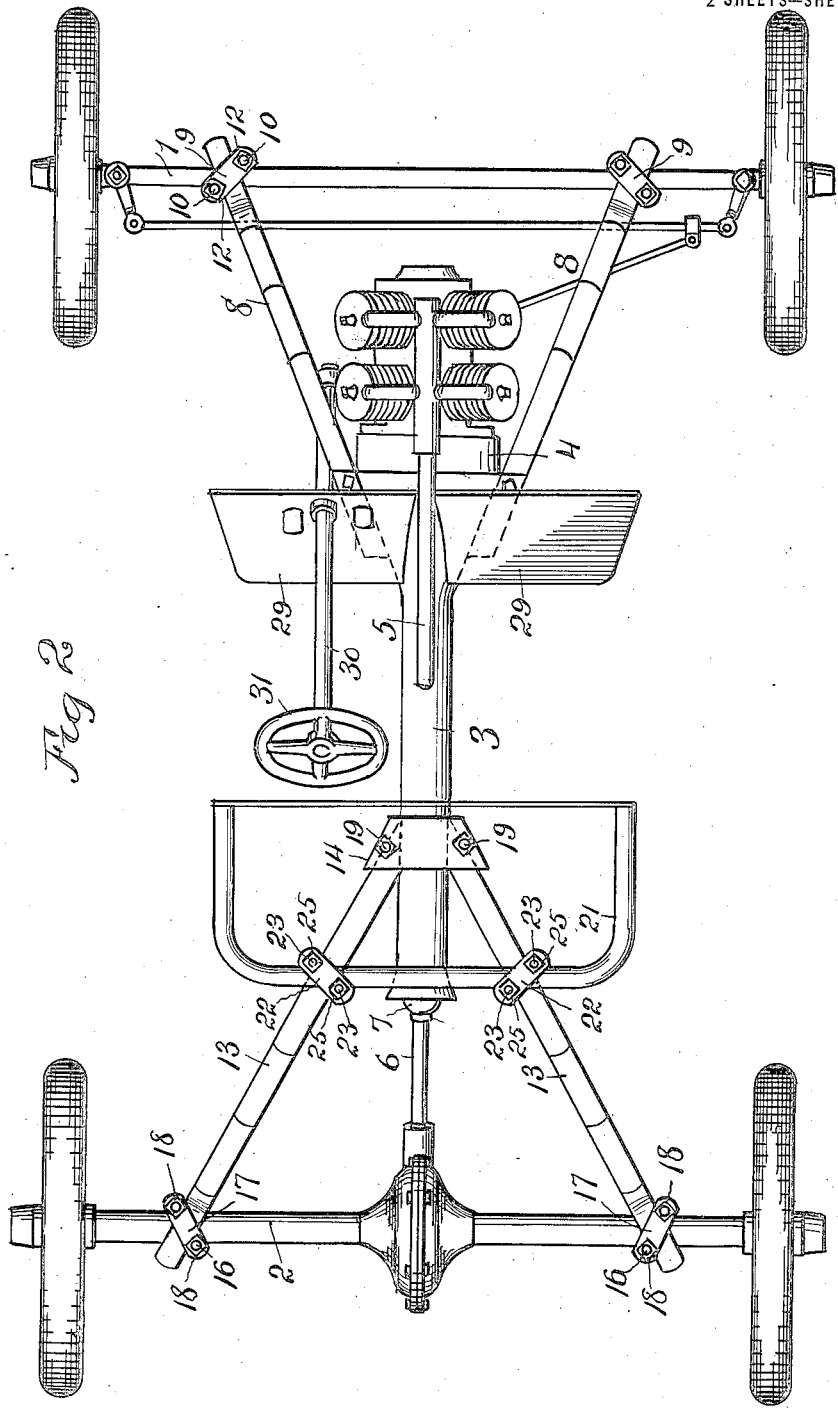

1,428,713

UNITED STATES PATENT OFFICE.

WILLIAM F. SCHOENHARD, OF KANSAS CITY, MISSOURI.

AUTOMOBILE.

Application filed July 15, 1920. Serial No. 396,566.

*To all whom it may concern:*

Be it known that I, WILLIAM F. SCHOENHARD, a citizen of the United States, residing at Kansas City, in the county of Jackson and State of Missouri, have invented a certain new and useful Improvement in Automobiles, of which the following is a specification.

My invention relates to improvements in automobiles.

The object of my invention is to provide a novel chassis for an automobile which is of light and strong construction, which is durable and not liable to get out of order, which is simple in construction, of few parts and cheap to manufacture, which has great flexibility and is efficient in operation.

The novel features of my invention are hereinafter fully described and claimed.

In the accompanying drawings, which illustrate the preferred embodiment of my invention, Fig. 1 is a side view, partly broken away, of my improved automobile.

Fig. 2 is a top view of the same.

Similar reference characters designate similar parts in the different views.

1 and 2 designate respectively the ordinary front and rear axles of an automobile. 3 designates an engine support, comprising a central longitudinal tube, upon the forward end of which is supported the body 4 of an explosive engine, having the usual exhaust pipe 5. The pipe 5 at its rear end discharges into the tube 3, the latter being, preferably, open at its rear end and having extending through it the usual drive shaft 6 provided with the ordinary universal joint 7 disposed at the rear end of the tube 3.

For supporting the forward end of the tube 3, I provide two substantially flat springs 8, which, preferably, diverge laterally and forwardly and have their rear ends attached to and supporting the tube 3 and having their forward ends supported on the axle 1, to which they are respectively secured by clamping plates 9 mounted on the top of the front axle 1, each plate 9 having extending through it two bolts 10, disposed at the forward and rear sides of the axle 1 and extending through a plate 11 which embraces the under side of the axle 1. The bolts 10 are provided with nuts 12 mounted on the adjacent plate 9.

The rear end of the tube 3 is supported by two substantially flat springs 13, which diverge laterally and rearwardly and which have their forward ends clamped between two plates 14 and 15, which respectively embrace the upper and lower sides of the tube 3, forward of the rear end thereof.

The rear ends of the springs 13 rest upon the top of the rear axle 2, to which the springs are respectively clamped by U-bolts 16, which embrace the axle 2, and which have their arms extending respectively through two plates 17, mounted respectively on the upper sides of the springs 13. The arms of each U-bolt 16 are provided respectively with nuts 18, which bear upon the top of the adjacent spring 13.

Extending through the plates 14 and 15 at opposite sides respectively of the tube 3, are two bolts 19 provided respectively with nuts 20, which bolts securely clamp the forward ends of the springs 13 to the tube 3.

Mounted on the tube 3 is a seat frame 21, which is clamped to the tops of the springs 13, by means of two plates 22, which bear upon the upper side of the seat frame 21. Through each plate 22 extend vertical bolts 23, disposed at opposite sides respectively of the adjacent spring 13. Each pair of bolts 23 extends through a plate 24, mounted on the under side of the adjacent spring 13. Each bolt 23 is provided with a nut 25, which bears against the top of the adjacent plate 22. Mounted on the seat frame 21, as shown in Fig. 1, is a cushion 26, supported on the frame 21, between two side arms 27, and in front of the back 28, of the seat.

Mounted on the tube 3 forward of the seat frame 21 are two inclined transverse foot boards 29. Through one of the foot boards 29 extends the steering post 30, provided with the usual steering wheel 31, which is within easy reach of the occupant of the seat.

By reason of the arrangement of the spring support for the tube 3, the chassis has great flexibility and resiliency and is strongly braced, by reason of the diverging spring against lateral strain. The construction also eliminates many of the parts ordinarily provided in the chassis of an automobile. The tubular construction of the engine support affords it great rigidity and strength while providing a closed housing for the transmission shaft and also a desirable discharge pipe for the engine exhaust. The tube 3 also serves as a muffler and prevents mud from entering the housing from below.

Owing to the limited number of the parts, the machine is relatively very light and cheap to manufacture, and makes the cost of upkeep relatively very small.

What I claim is:—

1. In an automobile, the combination with a front axle and a rear axle, of an engine support comprising a longitudinal tube open at its rear end, an engine carried by said tube having an exhaust pipe discharging into said tube, a drive shaft connected with the engine and extending through said tube, and springs supported by said axles and supporting said tube, substantially as set forth.

2. In an automobile, the combination with a front axle and a rear axle, of an engine support comprising a longitudinal tube, springs supporting at their rear ends said tube and supported at their forward ends by the front axle, two springs supporting at their forward ends said tube and supported at their rear ends by said axle, and a seat supported by and attached to the last named spring and said tube, substantially as set forth.

3. In an automobile, the combination with a rear axle, of an engine support comprising a longitudinal tube, two laterally and rearwardly diverging springs attached at their forward ends to and supporting said tube and attached at their rear ends to and supported by the rear axle, and a seat carried by said tube and attached to said springs at the rear of the forward end thereof, substantially as set forth.

4. In an automobile, the combination with a front axle and a rear axle, of an engine support comprising a longitudinal tube open at its rear end, an engine carried by said tube having an exhaust pipe discharging into said tube, a drive shaft connected with the engine and extending through said tube, two forwardly and laterally diverging springs supporting at their rear ends said tube and supported at their forward ends on the front axle, and two laterally and rearwardly diverging springs supporting at their forward ends said tube and supported at their rear ends upon said axle, substantially as set forth.

In testimony whereof I have signed my name to this specification.

WILLIAM F. SCHOENHARD.